United States Patent [19]

Ryan

[11] Patent Number: 4,555,656
[45] Date of Patent: Nov. 26, 1985

[54] GENERATOR AND RECHARGEABLE BATTERY SYSTEM FOR PEDAL POWERED VEHICLES

[76] Inventor: David Ryan, 3595 Sante Fe Ave., Space 77, Los Angeles, Calif. 90810

[21] Appl. No.: 572,398

[22] Filed: Jan. 20, 1984

[51] Int. Cl.⁴ .............................................. H02J 7/00
[52] U.S. Cl. ......................................... 320/5; 320/21; 322/1; 362/72
[58] Field of Search .................. 320/2, 3, 5, 21; 322/1; 310/75 C; 362/72, 173

[56] References Cited

U.S. PATENT DOCUMENTS 3,904,920  9/1975  Griffith ................................. 362/72

Primary Examiner—Peter S. Wong
Assistant Examiner—Anita M. Ault
Attorney, Agent, or Firm—Robert J. Schaap

[57] ABSTRACT

A generator and rechargeable battery system for use with pedal powered vehicles, such as bicycles, and where either the generator or battery can intermittently power a load such as a lighting system of the vehicle in one mode of operation, and in which the generator can recharge the battery in another mode of operation. A simple selection switch which is manually operable by the operator of the vehicle enables selection between powering of the load or recharging of the battery.

24 Claims, 5 Drawing Figures

GENERATOR AND RECHARGEABLE BATTERY SYSTEM FOR PEDAL POWERED VEHICLES

BACKGROUND OF THE INVENTION

1. Field of the Invention

This invention relates in general to certain new and useful improvements in generator and rechargeable battery systems for use with pedal powered vehicles such as bicycles, and more particularly, to a generator and battery system of the type stated in which a manually operable switch is operable by an operator of the vehicle so that the battery and generator can alternately power a load in one mode of operation and in which the generator can charge the battery in another mode of operation.

2. Brief Description of the Prior Art

As a result of energy shortages, particularly in fossil fuels, there has been a greater emphasis on the use of pedal powered vehicles such as bicycles as a mode of transportation and a lesser emphasis on vehicles using hydrocarbon fuels. This emphasis also has been increased as a result of increased pollution effects from the use of hydrocarbon combustion fuels.

Inasmuch as many bicyclists are now using their bicycles at times other than in daylight hours, there has been a need for both front and rear light systems on the bicycle and perhaps other electrically operable appliances such as horns and the like. Inasmuch as the bicyclist must propel his own weight and the weight of the vehicle, there is a strong sensitivity about increasing the weight of the bicycle by the addition of a storage battery, which can add a significant amount of weight. Consequently, most bicycles operate with relatively small conventional D-cell or C-cell type batteries. The very size of these batteries only provides a limited amount of power, either in current, or in operating time. Consequently, the batteries tend to burn out very quickly.

As a result of the constant and frequent and costly necessity of changing batteries, there have been several rechargeable battery systems for use with the powering of loads on bicycles. These systems rely upon the use of household current at about 110 V. and a step-down transformer. The transformer must be connected to the source of current and then by conductors to the batteries on the bicycle. However, it is necessary for the operator of the vehicle to constantly remember to recharge the batteries at periodic intervals or otherwise they will find themselves in a situation in which the batteries will die while they may be in transit.

There have been many combined battery-generator electrical systems for operating the lights of the vehicle and also recharging the batteries. Exemplary of systems of this type are those shown in U.S. Pat. No. 3,904,920 to Griffith and U.S. Pat. No. 3,894,281 to Bloomfield and U.S. Pat. No. 373,000 to Newman. Rechargable battery-generator systems of these types have limited usefulness in that they are usually quite expensive to manufacture and hence, the purchase cost may be fairly substantial. In addition, and due to the large number of components, they are not always reliable. This is particularly the case where the complex circuit may be subject to severe temperature changes from a relevantly cold winter to a relatively hot summer. In addition, many circuits of this type are sensitive to weather conditions such as high humidity and the like. Some of these lighting systems use a complex governer arrangement for switching between the battery and the generator for powering the load.

Each of the presently available or known lighting systems which use a generator and a battery source of power are costly and oftentimes unreliable in that they require the use of a number of electrical components, such as capacitors, various resistors including potentiometers, diodes and the like. Exemplary of a system which includes the need for resistors, capacitors and diodes is the aforesaid Griffith Patent. In like manner, the Bloomfield patent includes a fairly complex circuit which requires a large number of electrical components as does the aforesaid Newman patent. As a result of the foregoing, there is still a need for a very simple and reliable generator-battery system for use in operating the loads of a bicycle or similar vehicle and which still can be used for recharging the battery and which is also under the control of the operator of the vehicle.

OBJECTS OF THE INVENTION

It is, therefore, one of the primary objects of the present invention to provide a battery-generator system for use with pedal powered vehicles and in a first mode is capable of powering a load from either a battery or a generator and in a second mode is capable of using the generator to charge the battery.

It is another object of the present invention to provide a battery-generator system of the type stated for use with pedal powered vehicles and which includes relatively simple electrical circuitry containing, other than a relay, only one diode as an electrical component.

It is a further object of the present invention to provide a generator-rechargeable battery system of the type stated which is highly reliable in operation and can be constructed at a relatively low cost.

It is an additional object of the present invention to provide a generator-rechargeable battery system of the type stated which can be easily mounted on a large variety of differently sized vehicles.

It is yet another object of the present invention to provide a generator-rechargeable battery system of the type stated which is compact in construction and light in weight and which is constructed so that it will withstand weathering.

With the above and other objects in view, my invention resides in the normal features of form, construction, arrangement and combination of parts presently described and pointed out on the claims.

SUMMARY OF THE DISCLOSURE

A generator and rechargeable battery system for pedal powered vehicles, such as bicycles, and which have an electrically operable load thereon. In this case, the electrically operable load may adopt any form of electrically operable device, such as lights, horns, or combinations thereof, which are powered by conventional batteries of the type normally used on bicycles. These may include batteries such as the D-cell or C-cell batteries.

The term "pedal powered" as used herein with reference to vehicles, means those vehicles which have pedals or some means engaged by the feet or legs of a operator of the vehicle with power provided by the legs of the operator.

The generator and rechargeable battery system of the present invention comprises a generator which is operable by a rotatable member of the vehicle, such as a wheel, and which supplies electrical current when the rotatable member is rotated. This system also comprises a battery for supplying electrical current to the load and is operably connected to the generator for receiving current from the generator during a recharging of the battery.

The system of the present invention is operable in two modes, the first of which is a recharging mode and the second of which is a load energizing mode. In the recharging mode, the generator is used only to recharge the battery and not for powering the load.

In the load energizing mode, the load, such as the lights, may be powered from the generator when the generator is generating and providing sufficient current to the lights for energizing same. When the wheel of the vehicle is not rotating sufficiently, and the generator is not producing sufficient output, the system is operable to automatically switch to a battery source of power so that the load is energized by the battery.

The system comprises a two position manually operable switch which is operable at the selection of and by an operator of the bicycle. This manually operable switch causes the system to be operable in the first mode, with the generator charging the battery and not powering the load when the switch is in a first position. The manually operable switch also permits the system to be operable in the second mode, when the switch is in a second position, where the battery and the generator can be used to charge the load at different times. In this way, the operator of the vehicle has control over the manually operable control switch to either charge the battery through the generator or otherwise permit operation of the load by the generator and the battery.

The system also comprises a relay and a relay switch arrangement which is operable to cause the generator to power the load when the generator is generating a sufficient amount of current and which will automatically switch in response to the generator not generating a sufficient amount of current. This will thereby cause the battery to power the load. This relay and relay switch arrangement are only operable when the manually operable switch is in the first mode.

In one aspect of the invention, the system consists only of one electronic component and this electronic component is a diode. Further, the diode is connected to the output of the generator and is electrically interposed between the generator, on the one hand, and between the battery relay arrangement and manually operable switch and load on the other hand.

In a more preferred embodiment of the invention, the manually operable two position switch has four terminals or contacts, with the first terminal connected directly to the battery and a second terminal connected to the battery, as well. In this arrangement, the manually operable switch connects the battery to the generator when in the first position to enable recharging of the battery through the first terminal of the manually operable switch. This manually operable switch connects the load to the battery or the generator through the second terminal when in the second position. In this latter embodiment, the manually operable switch comprises a third terminal which is electrically connected to the relay and permits energization of the relay when the manually operable switch is in the second position. The relay is comprised of a relay switch and relay coils so that the third terminal is preferably connected to the relay coil. In addition, the relay switch has its first terminal connected to the generator and a second terminal connected to the manually operable switch.

This invention possesses many other advantages and has other purposes which may be made more clearly apparent from a consideration of the forms in which it may be embodied. These forms are shown in the drawings forming part of and accompanying the present specification. They will now be described in detail for purposes of illustrating the general principles of the invention, but it is to be understood that such detailed descriptions are not to be taken in a limiting sense.

BRIEF DESCRIPTION OF THE DRAWINGS

Figure 1:
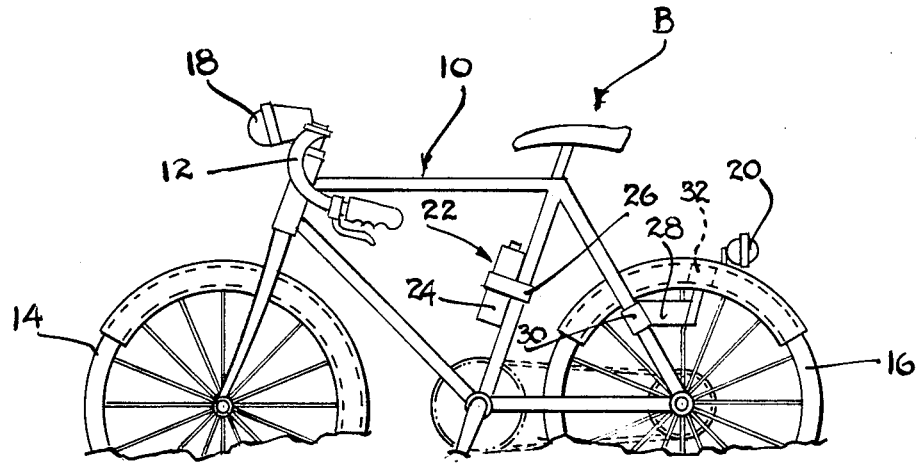
Figure 5:
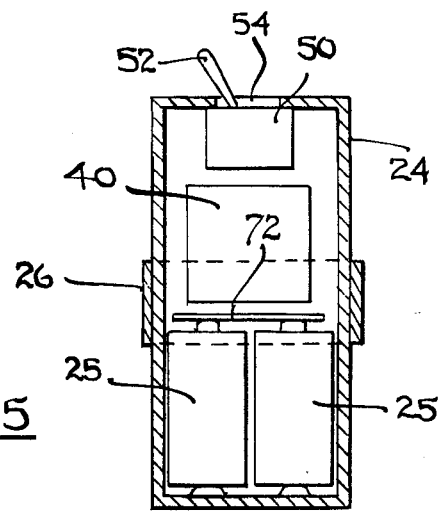
Figure 2:
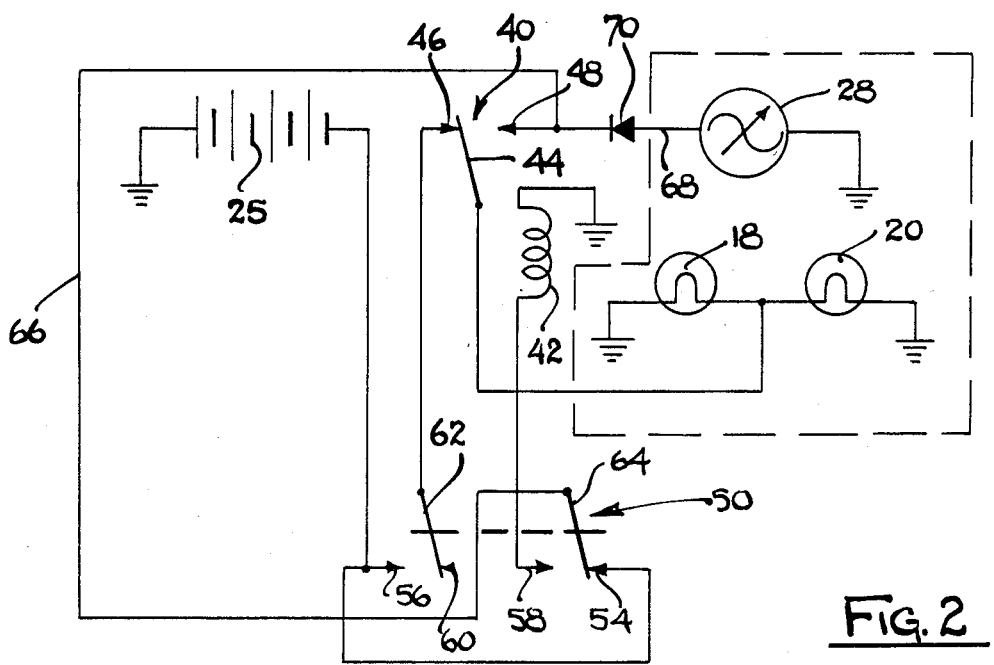
Figure 3:
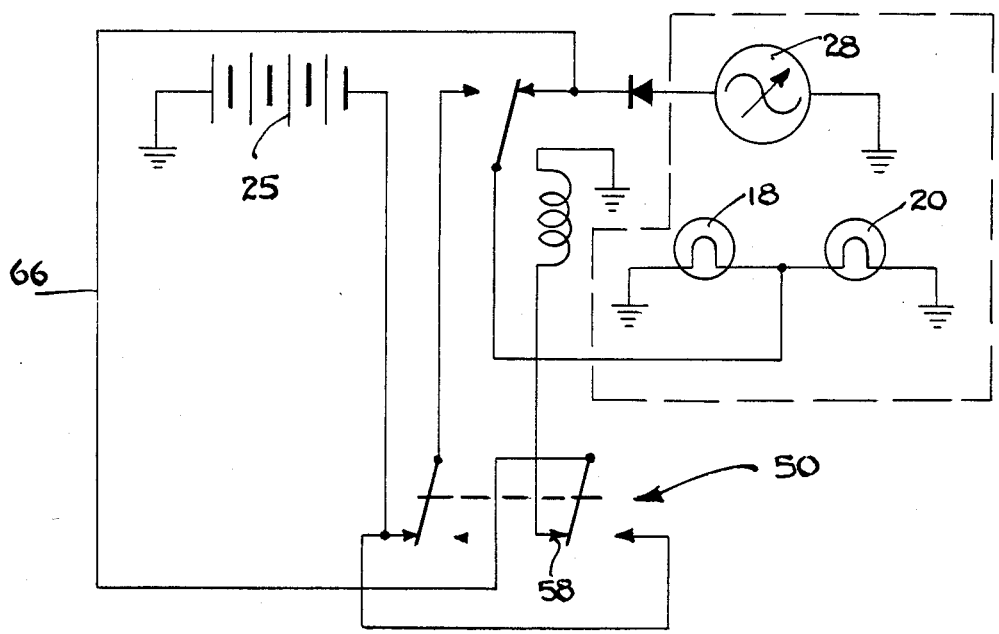
Figure 4:
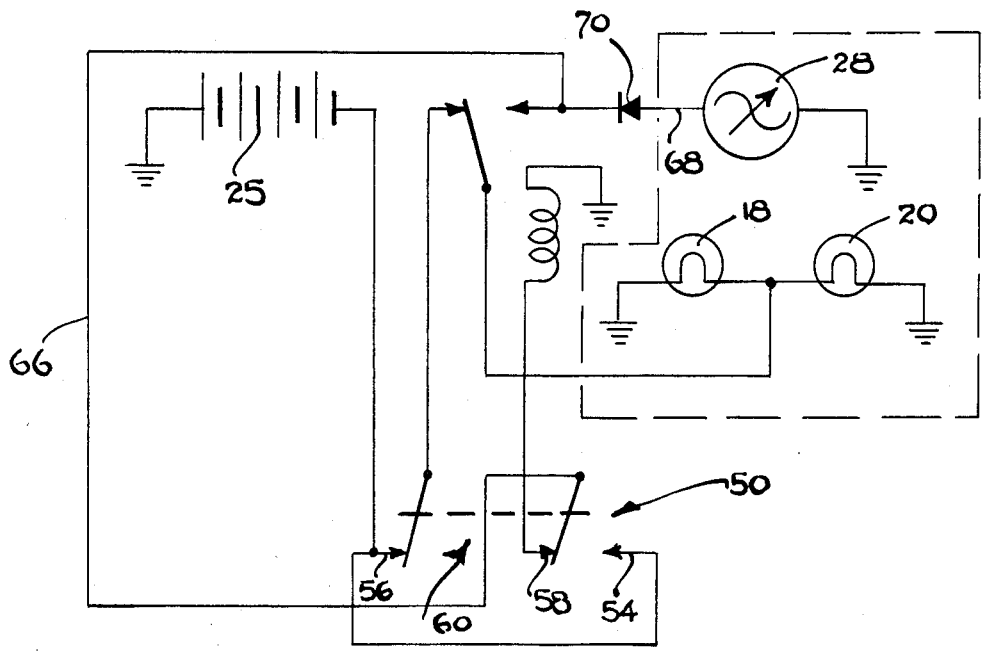

Having thus described the invention in general terms, reference will now be made to the accompanying drawings in which:

FIG. 1 is a fragmentary side elevational view of a conventional bicycle showing a portion of the system of the present invention used thereon;

FIG. 2 is a schematic circuit view of the generator and rechargeable battery system forming a part of the present invention and shown in the charging mode;

FIG. 3 is a schematic circuit view, similar to FIG. 2, and showing the generator and rechargeable battery system when operable in the second mode and when a load is being powered by the generator;

FIG. 4 is a schematic circuit view, similar to FIGS. 2 and 3, and showing the generator and rechargeable battery system and the present invention operable in the second mode and when the load is being powered by the battery; and FIG. 5 is a vertical sectional view showing the interior of a housing for containing some of the components forming part of the system of the present invention and which can be conveniently mounted on a bicycle.

DETAILED DESCRIPTION OF A PREFERRED EMBODIMENT

Referring now in more detail and by reference characters to the drawings, a conventional bicycle B is shown and is comprised of a frame 10 having handlebars 12. A front wheel 14 and a rear wheel 16 are conventionally mounted on the frame 10. The bicycle B may also be provided with an electrically operable load, such as a front light or headlight 18 which is mounted on the handlebars 12 thereof as well as a rear light 20, which may serve as a tail light. The headlight 18 and tail light 20 may be mounted on the bicycle by any conventional means such as brackets or the like. The exact means for mounting these electrically operable devices is neither illustrated nor described in any further detail herein.

As used herein, the headlight 18 and the taillight 20 will be conventionally referred to as the lights or electrically referred to as a "load" since they are electrically operable devices. Further, it is to be understood, that only one such light may be employed. While wires for connecting the headlight 18 and the tail light 20 to a system housing 22 mounted on the bicycle have not been shown, it should be understood that they would conventionally be present.

Components of the present invention can easily and conveniently be mounted in the system housing 22 which includes an outer cyclindrically shaped casing 24, which is more fully illustrated in FIG. 5 of the drawings. This casing 24 will contain batteries 25 and other electrical components forming part of the system of the present invention, as hereinafter described in more detail. Further, the cyclindrically shaped housing 24 can be mounted on the frame of the bicycle by means of a conventional bracket 26.

A generator 28 of conventional construction forms part of the system of the present invention and may also be mounted on the frame 10 of the bicycle by means of a conventional bracket 30. In this case, the bracket 26 and the bracket 30 can adopt the form of so-called "C-clamps". The generator 28 conventionally includes a roller 32 which is adapted to bear against and be rotated by the rear wheel 16. In this way, when the roller 32 is rotated, the generator 28 will cause a generation of an electrical current in a conventional fashion.

The system of the present invention comprises a relay 40 which is suitably disposed within the housing 24. Any means for mounting the relay in the housing 24 could be employed, but is not shown herein.

The relay 40 comprises a relay coil 42 and a relay switch 44 with a switch blade moveable between switch contacts or terminals 46 and 48. The terminal 48 is connected to the output of the generator 28. When the coil 42 is energized the switch blade of the switch 44 will be pulled and held into contact with the terminal and when de-energized will move into contact with the terminal 46. It is also possible to use a solid state relay in accordance with the present invention. This solid state relay could be, for example, a DIP integrated circuit relay.

Also forming part of the system of the present invention is a manually operable switch 50 which is operable by the operator of the vehicle and which is similarly mounted within the housing 24. The manually operable switch 50 includes a switch arm 52 which projects outwardly through an opening 54 in the housing 24 all in the manner as illustrated in FIG. 5. The manually operable switch 50, in the embodiment as illustrated, is a two position-four terminal switch, as shown. This manually operable switch 50 includes a first terminal 54 and a second terminal 56, and both of which are connected directly to one side of the battery 25, in the manner as illustrated in FIGS. 2 through 4. The manually operable switch 50 also includes a third terminal 58 which is connected directly to the relay coil 42 and a fourth terminal 60 which may be connected directly to the terminal 46 forming part of the relay switch 40. The switch 50 is comprised of a pair of switch blades 62 and 64 which are mechanically connected and moveable together. The switch blade 62 is moveable between the switch contacts 56 and 60 and the switch blade 64 is moveable between the contacts 54 and 58, also as shown in FIGS. 2 through 4 of the drawings.

The switch blade 64 is connected to a conductor 66 which is, in turn, connected directly to a conductor 68 on the output side of the generator 28. A diode 70 is interposed in the conductor 68 to insure that electrical current from the battery is not introduced into the generator 28. It can be observed that the diode is biased so that current generated by the generator 28 will only pass outwardly thereof along the conductor 68.

The switch 50 is shown in a first mode of operation in FIG. 2 which is a charging mode of operation. When in this position, the switch 44 of the relay will always be in the position as shown in FIG. 2. Further, in this mode of operation, the generator 28 will only charge the batteries 25. FIGS. 3 and 4 illustrate the switch 50 in a second mode of operation which is a load powering mode. In this case, the load, such as the lights 18 and 20, can be powered either by the batteries 25 or by the generator 28, in a manner to be hereinafter described in more detail.

FIG. 5 illustrates one arrangement for the housing 24. In this case, it can be observed that the batteries 25 can be conveniently mounted within the bottom of the casing and a metal conductor plate 72 disposed over the upper surface thereof. This conductor plate could be electrically connected to the relay 40 in the switch 52 by means of wires (not shown). Further, wires would extend outwardly of the housing for connection to the generator 28, and the lights 18 and 20. If required, a current dropping resistor could be connected in the battery charging circuit for battery protection.

It can be observed that this simple and inexpensive housing may contain all of the major electrical components such as the switch 50 and the relay 40 as well as the batteries 25. In this way, the system of the invention can be provided with a generator and a simple housing containing all of the necessary components. The housing 24 itself, may be inexpensively formed in any of a number of plastic molding techniques and the housing itself may be formed of a moldable plastic, such as polyehtylene, polystyrene, or the like.

OPERATION OF THE SYSTEM

A portion of the operation of the system of the present invention has been described with reference to the system itself. However, the following description is more illustrative of the operation of the system and the co-action of the various components forming part of the system.

When the operator is using a vehicle, such as a bicycle and propels the same, rotation of the wheel 16 will effectively cause rotation of the armature of generator 28 and hence generation of an electrical current. It can be observed that the generated current will pass outwardly from the generator 28 through the diode 70, but reverse current flow is prohibited by the diode 70.

In the first mode of operation, and when the operator of the vehicle wishes to recharge the batteries 25, the operator will shift the manually operable switch 50 to the first position, as shown in FIG. 2. In this way, the terminals 54 and 56, which are always connected to one terminal of the battery, will complete a current flow path from the the generator 28 through the line designated as 66 to the battery. Further, it can be observed that when the switch 50 is in the first mode or first position, no current flow will be permitted to the load, such as the lights 18 and 20. Further, when the switch 50 is in the first mode, the blade of switch 44 forming part of the relay 40 will always be biased so that it is in contact with the terminal 46, as aforesaid.

The operator of the bicycle can permit the switch 50 to remain in the first position, as shown in FIG. 2, as long as the operator wishes to charge the batteries 25. Further, and while it is desirable to shift the switch 50 to the second position when the bicycle is parked, there will not be any significant discharge of the battery, even if left in the first position, due to the presence of the diode 70.

When the operator of the vehicle desires to energize the load, such as the lights 18 and 20, the operator will shift the manually operable switch 50 to the second position, as shown in FIG. 3. When the operator is powering the vehicle, a current flow from the generator 28 will occur through the terminal 48 of the relay switch 40 directly to the load. In addition, and to hold the relay switch 40 in the position as shown in FIG. 3, current flow will also occur in the conductor 66 through the terminal 58 of the manually operable switch 50 and to the relay coil 42. Energization of the relay coil 42 will always hold the relay switch 44 so that the blade is in contact with the terminal 48, in the position as shown in FIG. 3. In this way, so long as there is sufficient current flow from the generator 28, the relay coil 42 will maintain the switch 44 in this position to permit energization of the load.

When the operator of the vehicle slows the rotation of the rear wheel 16 to a point where there is inadequate current flow from the generator 28, the relay coil 42 will not be sufficiently energized to hold the switch 44 in contact with the terminal 48. Therefore, the switch blade of the switch 44 will be normally biased back into contact with the terminal 46. As this occurs, current flow from the generator to the load can no longer exist.

When the relay 40 is not energized, permitting current flow from the generator 28 to the load 18 and 20, the batteries 25 will supply current through the current path as shown in FIG. 4. In this way, the current from the battery will flow through the terminal 56 and through the terminal 46 directly to the load 18 and 20. This condition will continue so long as there is inadequate current flow from the generator 28. When there is adequate current flow from the generator 28, the relay coil 42 will once again become energized and cause the relay switch 40 to close so that the switch blade is in contact with the terminal 48, thereby again permitting the generator 28 to power the load 18 and 20.

Thus, there has been illustrated and described a unique and novel generator and rechargeable battery system for use with pedal powered vehicles, such as bicycles, and which permit recharging of a battery in a first mode of operation and a powering of a load in a second mode of operation from either the generator or the battery. Thus, the present invention fulfills all of the objects and advantages sought therefore. It should be understood that many changes, modifications, variations, and other uses and applications will become apparent to those skilled in the art after considering this specification and the accompanying drawings. Therefore, any and all such changes, modifications, variations and other uses which do not depart from the spirit and scope of the invention are deemed to be covered by the invention which is limited only by the following claims.

Having thus described my invention, what I desire to claim and secure by Letters Patent is:

1. A generator and rechargeable battery system for pedal powered vehicles having an electrically operably load thereon, said system comprising:
   (a) a generator operable by a rotatable member of said vehicle and which supplies electrical current when the rotatable member is rotating,
   (b) a battery for supplying electrical current to the load and being operatively connected to the generator for receiving current therefrom for recharging thereof,
   (c) a two position manually operable switch which is operable at the selection of and by an operator of the vehicle, said manually operable switch causing said system to be operable in a first mode where the generator can charge the battery and not power the load when the switch is in a first position, and said manually operable switch causing said system to be operable in a second mode where said battery and said generator can be used to charge said load at different times,
   (d) a relay and relay switch arrangement operable to cause said generator to power the load when said generator is generating a sufficient amount of current and which will switch in response to the generator not generating a sufficient amount of current to thereby cause the battery to power the load, said relay and relay switch arrangement only being operable when said manually operable switch is in the second mode, and
   (e) a diode constituting the only electronic component of said system, said diode being connected to an output of said generator and electrically interposed between the generator and the battery and rely arrangement and manually operable switch and load.

2. The generator and rechargeable battery system of claim 1 further characterized in that said load is a light and said vehicle is a bicycle which is powered by the legs of the operator.

3. A generator and rechargeable battery system for pedal powered vehicles having an electrically operable load thereon, said system comprising:
   (a) a generator operated by a rotatable member of said vehicle and which supplies electrical current when the rotatable member is rotating,
   (b) a battery for supplying electrical current to the load and being operatively connected to the generator for receiving current therefrom for recharging thereof,
   (c) a relay having a relay switch with a first position in which the generator is connected to the load for powering same and a second position in which the generator may be connected for recharging the battery of the vehicle, and
   (d) a manually operable two position switch operable at the selection of and by an operator of the vehicle, said manually operable switch having a first terminal connected to said battery and a second terminal connected to said battery so that said manually operable switch connects said battery to the generator when in a first position to permiting charging of the battery through the first terminal and connects said load to said battery or generator through the second terminal when in a second position.

4. The generator and rechargeable battery system of claim 3 further characterized in that said manually operable switch comprises a third terminal which is connected to said relay and permits energization of said relay when said manually operable switch is in the second position.

5. The generator and rechargeable battery system of claim 4 further characterized in that said manually operable switch comprises a fourth terminal which remains unconnected when the switch is in the first and the second position.

6. The generator and rechargeable battery system of claim 4 further characterized in that said relay comprises a relay switch and a relay coil and said third terminal is connected to said relay coil.

7. The generator and rechargeable battery system of claim 6 further characterized in that said relay switch comprises a first terminal connected to said generator and a second terminal connected to said manually operable switch.

8. The generator and rechargeable battery system of claim 3 further characterized in that said system consists of only one electronic component which is a diode.

9. The generator and rechargeable battery system of claim 9 further characterized in that said diode is connected to an output of said generator and electrically interposed between the generator and the battery and relay arrangement and manaually operable switch and load.

10. The generator and rechargeable battery system of claim 3 further characterized in that said load is a light and said vehicle is a bicycle which is powered by the legs of the operator.

11. An electrical circuit arrangement for a battery and generator and a load on a pedal powered vehicle and where the battery can power the load when the generator is not operating and the generator can power the load when operating, or recharging the battery when operating, said circuit arrangement comprising:
   (a) a relay having a relay coil and a relay switch with a first position in which the generator is connected to the load for powering same and a second positon in which the generator may be connected for recharging the battery of the vehicle, said relay switch having a first terminal connected to said generator and a second terminal,
   (b) a manually operable two position switch operable at the selecton of and by an operator of the vehicle, said manually operable switch having a first terminal connected to said battery and a second terminal connected to said battery so that said manually operable switch connects said battery to the generator when in a first position to permit charging of the battery through the first terminal of said manually operable switch and connect said load to said battery or generator through the second terminal of said manually operable switch when in a second position, said second terminal of said relay switch also being connected to said manually operable switch, and
   (c) a diode connectable to said generator for permitting current flow outwardly from said generator and not permitting current flow into said generator.

12. The electrical circuit arrangement of claim 11 further characterized in that said two position manually operable switch is operable at the selection of and by an operator of the vehicle, and causes said system to be operable in a first mode where the generator can charge the battery and not power the load when the switch is in a first position, and said manually operable switch being operable to cause said system to be operable in a second mode where said battery and said generator can be used to charge said load at different times, and
   said relay coil and relay switch being operable to cause the generator to power the load when the generator is generating a sufficient amount of current and which will switch in response to the generator not generating current to thereby cause the battery to power this load, said relay and relay switch only being operable when said manually operable switch is in the first mode.

13. The electrical circuit of claim 12 further characterized in tht said manually operable switch comprises a third terminal which is connected to said second terminal of said relay switch and permits energization of said relay coil when said manually operable switch is in the second position.

14. The electrical circuit of claim 13 further characterized in that said manually operable switch comprises a fourth terminal which remains unconnected when the manually operable switch is in the first or the second position.

15. The electrical circuit of claim 14 further characterized in that said relay switch comprises a first terminal connectable to said generator and a second terminal connected to said manually operable switch.

16. A generator - rechargeable battery system for use with pedal powered vehicles which have an electrically operable load thereon, said system comprising:
   (a) a generator operable by a moving member of the vehicle when propelled to generate an electrical current,
   (b) a battery providing a source of stored electrical power sufficient to operate an electrical load on said vehicle,
   (c) a manually operable switch means comprising a first terminal always connected to said battery and a second terminal always connected to said battery, said manually operable switch means operable by an operator of the vehicle for switching between a first mode of operation so that the battery is connected to the generator in such manner that the generator recharges the battery, and a second mode of operation in which the generator powers the load when sufficient current is being generated thereby and the battery powers the load when the generator is not providing sufficient current,
   (d) a relay means operable when the manually operable switch is in the second mode to effectively monitor current output from the generator, said relay means comprising a relay coil which is energized and de-energized and a relay swtich operable by said relay coil to maintain a connection of the generator to the load in the second mode of operation for as long as current is generated thereby, said relay coil and relay switch maintaining a connection of the battery to the load and disconnecting the generator from the battery when the generator is not generating current, and
   (e) as a sole electronic component of said system a diode operatively connected to said generator.

17. The generator - rechargeable battery system of claim 16 further characterized in that said diode is connected to permit current generated at said generator to flow into said system but precludes current from flowing back to said generator.

18. The generator - rechargeable battery system of claim 17 further characterized in that said relay coil is energizable to maintain a connection between the load and generator in the second mode of operation and when de-energized maintains a connection between the load and the battery in the second mode of operation.

19. The generator - rechargeable battery system of claim 16 further characterized in that the manually operable switch is a two position four terminal switch.

20. A generator - rechargeable battery system for use with pedal powered vehicles which have an electrically operable load thereon, said system comprising:
   (a) a generator operable by a moving member of the vehicle when propelled to generate an electrical current,
   (b) a battery providing a source of stored electric power sufficient to operate an electrical load on said vehicle,
   (c) manually operable switch means operable by an operator of the vehicle for switching between a first mode of operation in which the battery is connected to the generator in such manner that the generator recharges the battery, and a second mode of operation in which the generator and the battery individually and at different times supply power to the load, said manually operable switch means comprising a first terminal connected to said battery and a second terminal connected to said battery, (d) a relay means operable when the manually operable switch means is in the second mode, said relay means comprising:
  (1) a relay coil energizable at selected times when the manually operable switch is actuated to operate in the second mode,
  (2) and a relay switch operable by said relay coil, said relay switch being connected to maintain a connection of the generator to the load for as long as current is generated thereby, said relay coil being de-energized and said relay switch maintains a connection of the battery to the load and disconnecting the generator when the generator is not generating current, and (e) as only one electronic component of said system a diode which is connected to permit current generated at said generator to flow into said system but, which precludes current from flowing back to said generator.

21. A circuit arrangement for use with a pedal powered vehicle having an electrically operable load thereon and with a battery to power the load and a generator to power the load when the vehicle is moving to enable said generator to generate electrical current, said circuit arrangement comprising:

(a) manually operable switch means operable by an operator of the vehicle for switching between a first mode of operation in that the battery is connected to the generator in such manner that the generator recharges the battery, and a second mode of operation in which the generator powers the load when sufficient current is being generated thereby and the battery powers the load when the generator is not providing sufficient current, said manually operable switch comprising:
  (1) a first terminal always connected to said battery, and
  (2) a second terminal always connected to said battery,
  (3) a first switch blade, and
  (4) a second switch blade providing connection to said generator, (b) a relay means operable when the manually operable switch is in the second mode, said relay means comprising:
  (1) a relay coil energizable at selected times when the manually operable switch is actuated to operate in the second mode, and being connected to a third terminal on said manually operated switch, and
  (2) and a relay switch operable by said relay coil, said relay switch having a first terminal connected to said second switch blade of said manually operable switch, and said generator, said relay switch having a second terminal connected to a fourth terminal on said manually operable switch, said relay means effectively monitoring current output from the generator to maintain a connection of the generator to the load for as long as current is generated thereby and maintaining a connection of the battery to the load and disconnecting the generator when the generator is not generating current, and (c) as a sole electronic component of said system a diode operatively connected to said generator.

22. The circuit arrangement of claim 21 further characterized in that a diode is connected to permit current generated at said generator to flow into said system but precludes current from flowing back to said generator.

23. A generator - rechargeable battery system for use with pedal powered vehicles which have an electrically operable load thereon, said system comprising:

(a) a generator operable by a moving member of the vehicle when propelled to generate an electrical current, (b) a battery providing a source of stored electric power sufficient to operate an electrical load on said vehicle, (c) a manually operable two position four terminal switch operable by an operator of the vehicle for switching between a first mode of operation in which the battery is connected to the generator in such manner that the generator recharges the battery, and a second mode of operation in which the generator and the battery individually and at different times supply power to the load, said manually operable switch means comprising a first terminal connected to said battery and a second terminal connected to said battery, (d) a relay means operable when the manually operable switch means is in the second mode, said relay means comprising:
  (1) a relay coil energizable at selected times when the manually operable switch is actuated to operate in the second mode,
  (2) and a relay switch operable by said relay coil, said relay switch being connected to maintain a connection of the generator to the load for as long as current is generated thereby, said relay coil being de-energized and said relay switch maintains a connection of the battery to the load and disconnecting the generator when the generator is not generating current, said manually operable switch also comprising a third terminal connected to said relay means and a fourth terminal capable of being connected to said relay means.

24. A generator - rechargeable battery system for use with bicycles which have an electrically operable load thereon, said system comprising:

(a) a generator operable by a moving wheel of the bicycle when propelled to generate an electrical current, (b) a battery providing a source of stored electric power sufficient to operate an electrical load on said bicycle, (c) a manually operable two position four terminal switch operable by an operator of the bicycle for switching between a first mode of operation in which the battery is connected to the generator in such manner that the generator recharges the battery, and a second mode of operation in which the generator and the battery individually and at different times supply power to the load, said manually operable switch means comprising a first terminal connected to said battery and a second terminal connected to said battery, (d) a relay means operable when the manually operable switch means is in the second mode, said relay means comprising:
  (1) a relay coil energizable at selected times when the manually operable switch is actuated to operate in the second mode,
  (2) and a relay switch operable by said relay coil, said relay switch being connected to maintain a connection of the generator to the load for as long as current is generated thereby, said relay coil being de-energized and said relay switch maintains a connection of the battery to the load and disconnecting the generator when the generator is not generating current, said manually operable switch also comprising a third terminal connected to said relay means and a fourth terminal capable of being connected to said relay means.

* * * * *